UNITED STATES PATENT OFFICE.

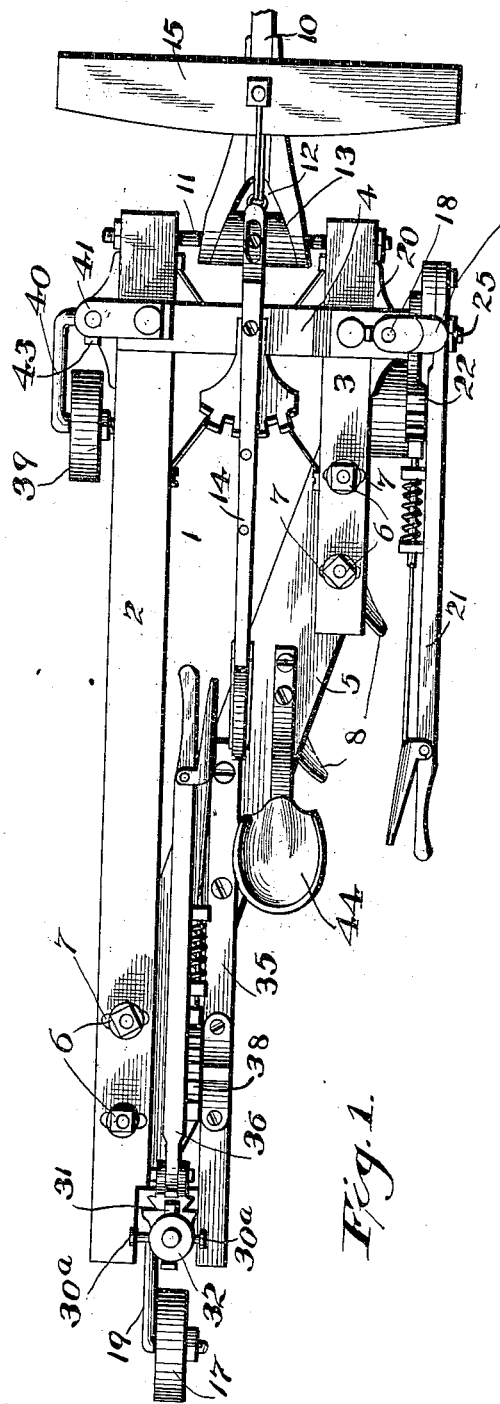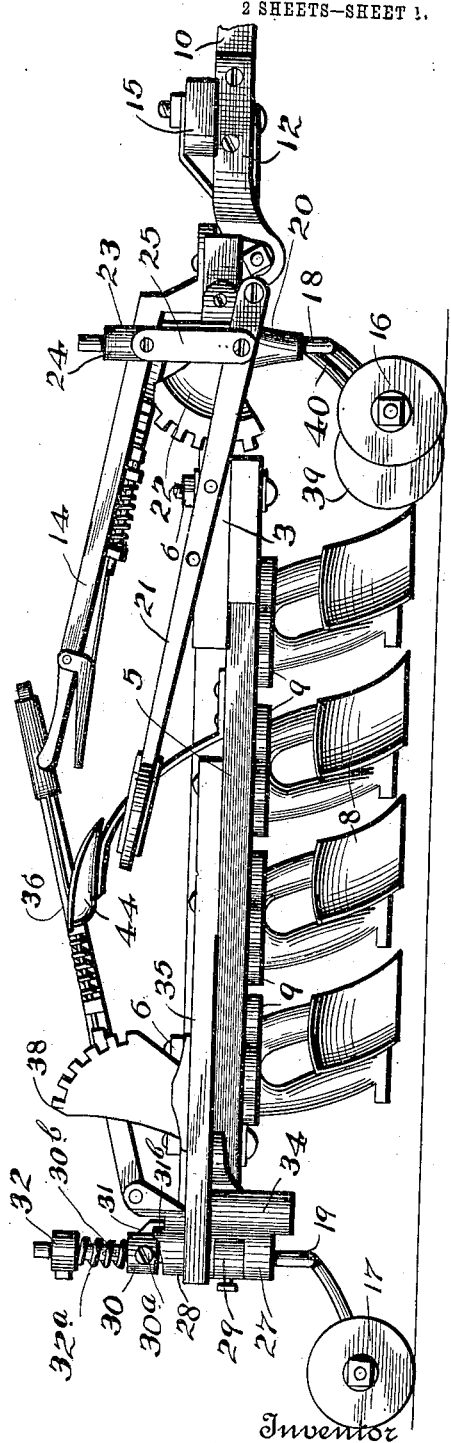

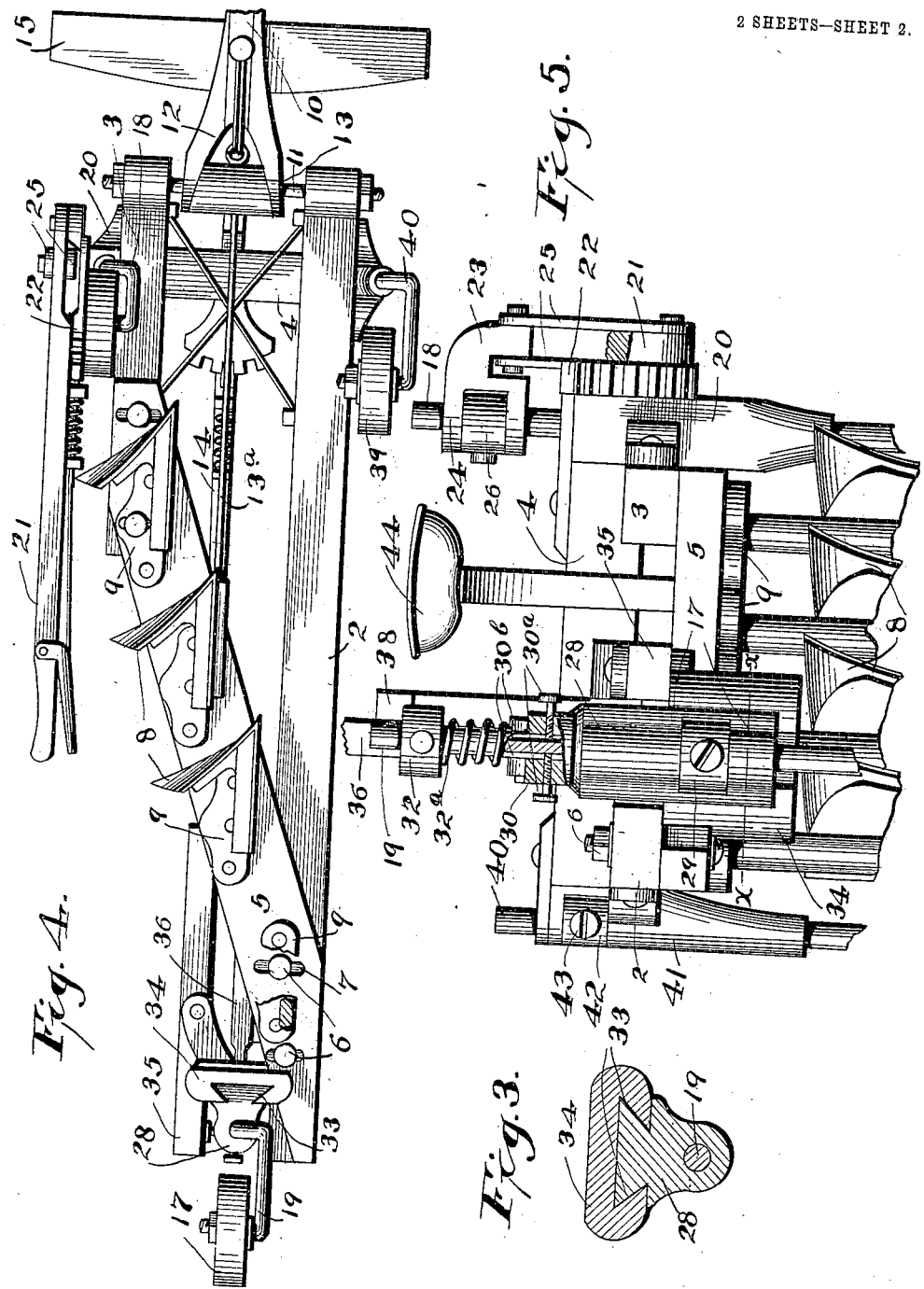

JOHN W. HUDSON, OF IOWA PARK, TEXAS.

PLOW.

No. 825,127.   Specification of Letters Patent.   Patented July 3, 1906.

Application filed June 29, 1905. Serial No. 267,622.

*To all whom it may concern:*

Be it known that I, JOHN W. HUDSON, a citizen of the United States, residing at Iowa Park, in the county of Wichita and State of Texas, have invented certain new and useful Improvements in Plows; and I do hereby declare the following to be a full, clear, and exact description of the invention, such as will enable others skilled in the art to which it appertains to make and use the same.

My invention relates to improvements in plows.

It has for its object, among others, to provide a plow with a beam adapted to be adjusted to carry different sizes of plows and with means to adjust the draft connection so that the line of draft will pass through the central point of the beam and equalize the resistance on both sides thereof.

The invention consists in the features of construction and combinations of parts hereinafter described, and more particularly pointed out in the claims concluding this specification.

In the accompanying drawings, illustrating the preferred embodiment of my invention, Figure 1 is a plan view of a plow constructed in accordance with my invention. Fig. 2 is a side view thereof. Fig. 3 is an enlarged broken horizontal sectional view on the line $x\,x$ of Fig. 5. Fig. 4 is an under plan view of the plow, part of the rear plow being broken away to show the slots for adjusting the beam, the dovetail connection between the main frame and the sliding block carrying the rear wheel also being shown in this figure; and Fig. 5 is an enlarged broken view looking at the rear end of the plow.

While the accompanying drawings illustrate the preferred embodiment of my invention and the construction and operation thereof are described in this specification, the right is reserved to make such changes from the construction shown and described herein as the scope of the claims hereunto appended will permit.

In carrying out my invention I construct the main frame 1 with a long bar 2 on one side and a short bar 3 on the other side, connected at the front by a cross-bar 4. The beam 5 is arranged diagonally between the short and long side bars, to which it is adjustably connected by bolts 6, passing through slots 7 in said beam. The plows 8 are arranged at intervals along the beam parallel with the line of draft. Said plows are provided with horizontal upper plate portions 9, whereby they are connected to the beam. This horizontal plate connection between the plows and the beam is much stronger than the ordinary perpendicular standard connections and will stand more rough usage, as working rocky ground. When a small size of plow is used, the beam is adjusted so as to form a less angle with the side bars, so as to bring the plows more nearly in line, while when larger plows are used the beam is arranged at a greater angle with said side pieces.

In order to have the line of draft through the center of the beam, I mount the tongue 10 to slide on a cross-bar 11. The rear end of the tongue is preferably forked, as shown at 12, and loosely pivoted around said cross-bar, and a collar 13 is arranged around said bar between the prongs of the fork. A tie rod or brace 13$^a$ is secured about midway of the beam and extends through the collar 13 and connects with the tongue, thereby relieving the strain on the side bars of the frame. To said collar is attached the horizontally-pivoted hand-lever 14, whereby said tongue is actuated, said lever having the usual spring-pressed pawl adapted to engage a segmental rack for holding it at each adjustment. The crosstree 15 is arranged on top of the tongue by which it is supported, so that it does not hang down where it will come in contact with the horse's heels in turning. By thus supporting the tree the draft is brought in line with the beam, so as not to lift the plow out of the ground.

The furrow caster-wheels 16 and 17, one arranged at each end of the beam, are mounted on rods 18 and 19, respectively. The rod 18, carrying the forward furrow-wheel, is mounted to slide in a bracket 20, secured to the side of the short side bar. To this bracket is pivoted the hand-lever 21, also provided with a spring-pressed pawl adapted to engage the segmental rack 22, also secured to said bracket. Said lever is connected to the extended arm 23 on the double collar 24, mounted around said rod 18 by links 25. A separate collar 26 is arranged between the upper and lower portions of the double collar and is provided with a set-screw to engage the rod, whereby the latter is held in the same horizontal plane, but is permitted to revolve to permit free movement of the caster-wheel.

The wheel 17 at the rear end of the beam is mounted on a rod 19, extending through vertical passages in upper and lower extended portions 27 of a bracket 28. A collar 29, adapted to be rigidly secured to said rod, is arranged between said upper and lower extended portions of said bracket. Above said bracket is arranged another collar 30, having inwardly-extending pins 30$^a$, engaging vertical slots 30$^b$ in the rod and provided with a locking lug or latch 31, adapted to fit into a notch 31$^b$ in the top of the bracket. When said lug is in engagement with said notch, the rod is prevented from turning, while when it is out of engagement with said notch said rod and wheel are free to turn either way. In order to hold said collar 30 normally with its lug or latch engaging the notch, I provide a third collar 32 above said collar 30 and mount a coiled spring 32$^a$ between them. The bracket 28 as a whole has a sliding dovetail connection 33 with a block 34, secured to the rear end of the long side bar of the frame and a shorter brace-bar 35, fastened to the beam. The bracket is raised and lowered by the hand-lever 36, having a pawl to engage the segmental rack 38. The other front corner of the frame is supported by a third casterwheel 39, mounted on a rod 40, fitting in a bracket 41 and held revolubly in place by the collar 42, provided with the set-screw 43, whereby said rod may be raised or lowered. It will be noted that all three hand-levers for adjusting the tongue and the two furrow-wheels extend near to the driver's seat 44, so that they are in easy reach of the driver.

Having thus described my invention, what I claim as new, and desire to secure by Letters Patent, is—

1. The combination, in a gang-plow, with a rigid main frame mounted on wheels, of a diagonally-arranged beam carrying plows and adapted to be adjusted at both ends to various horizontal angles with the frame whereby the width of the cut of the plow is changed.

2. The combination, in a gang-plow, with a main frame, of a diagonally-arranged beam secured to said frame, a transverse rod at the front of said frame, an adjustable tongue having its rear end forked and mounted to slide on said rod, a sleeve also mounted on said rod between the prongs of the fork of the tongue and a hand-lever pivoted to said sleeve and adapted to move it against the tongue to adjust said tongue laterally.

3. The combination, in a gang-plow, with a main frame comprising long and short parallel side bars, a cross-bar connecting the forward ends of said side bars and a beam connecting the rear ends of said side bars and arranged at an angle with the front cross-bars, said beam adapted to be adjusted to various horizontal ends with said front cross-bar, of a rod secured to said front cross-bar parallel thereto, an adjustable tongue having its rear end mounted to slide on said rod, a sleeve also mounted on said rod and a hand-lever pivoted to said sleeve and adapted to move it against the tongue to adjust said tongue laterally.

4. The combination, in a gang-plow, with a main frame, a diagonally-arranged beam secured to said frame, furrow-wheels arranged at each end of said beam, said rear furrow-wheel carried by a bracket having vertical sliding dovetail connection with said frame.

5. The combination, in a gang-plow, of a main frame comprising long and short parallel side bars, a front cross-bar connecting the forward ends of said side bars, a diagonally-arranged beam secured to the rear ends of said side bars, an intermediate short bar arranged parallel to the long side bar and extending from its rear end to the point where it intersects the beam to which it is secured, a casting secured between said long side bar and said intermediate bar, a furrow-wheel carried by a bracket having vertical sliding dovetail connection with said casting and another furrow-wheel arranged at the other end of the beam.

6. The combination, in a gang-plow, with a main frame, of a diagonally-arranged beam carrying a series of plows secured to said frame, furrow caster-wheels arranged at each end of said beam, the rear caster-wheel mounted on a vertical rod carrying a collar having a latch adapted to engage a notch at one position to hold said rod from turning, said rod adapted to turn freely when said latch is not engaging said notch.

7. The combination, in a gang-plow, with a main frame, of a diagonally-arranged beam, carrying a series of plows and secured to said frame, furrow caster-wheels arranged at each end of said beam, the rear caster-wheel mounted on a vertical rod carrying a collar having a latch adapted to engage a notch at any position to hold said rod from turning, said rod adapted to turn freely when said latch is not engaging said notch and means to normally hold said latch in said notch.

In testimony whereof I affix my signature in presence of two witnesses.

JOHN W. HUDSON.

Witnesses:
R. W. HYDE,
J. A. TANNER.